Oct. 12, 1926.
W. R. JOHNSON
DECOY
Filed Dec. 8, 1924
1,603,114
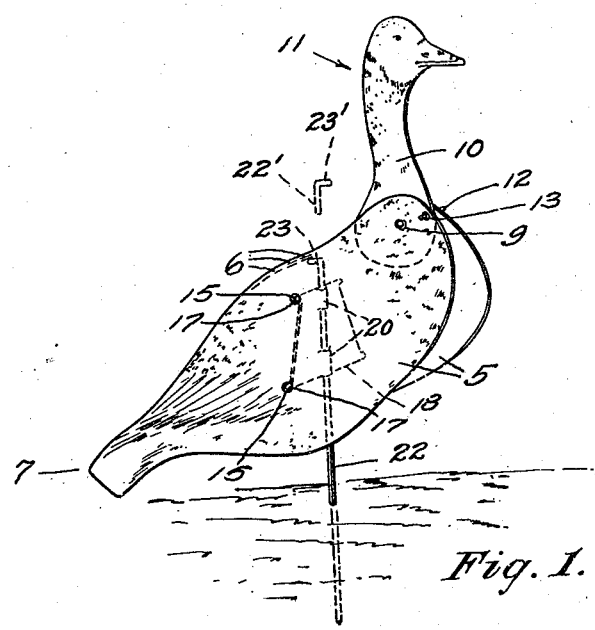
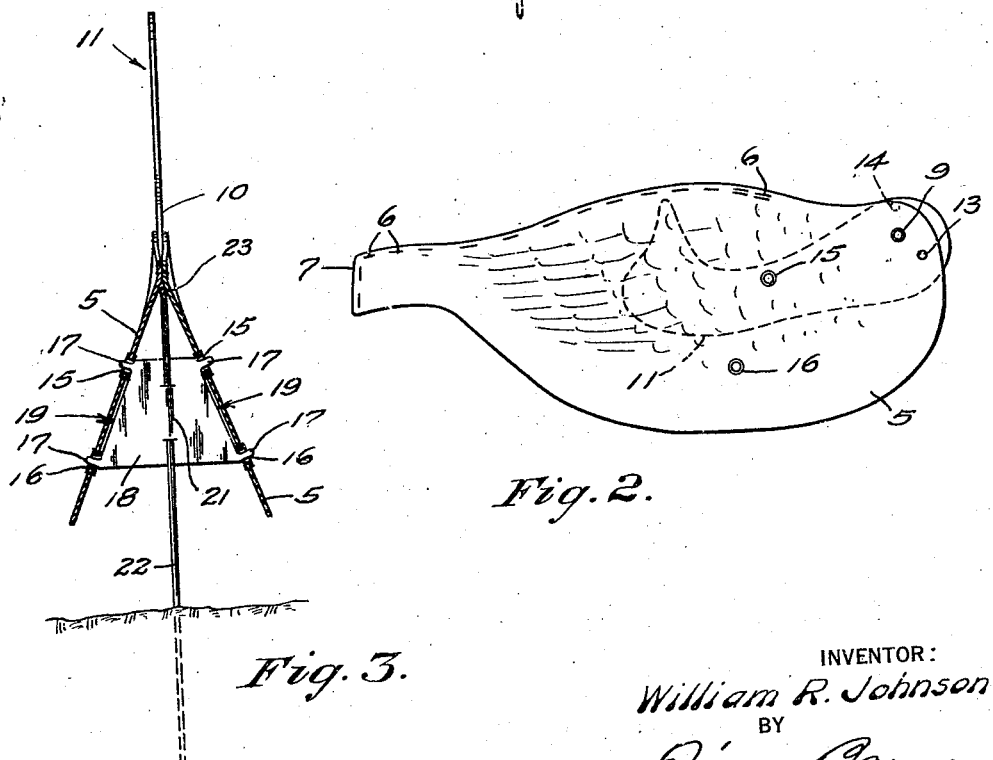
Fig. 1.
Fig. 2.
Fig. 3.
INVENTOR:
William R. Johnson
BY
Pierre Barnes
ATTORNEY Patented Oct. 12, 1926.

1,603,114

UNITED STATES PATENT OFFICE.

WILLIAM R. JOHNSON, OF SEATTLE, WASHINGTON.

DECOY.

Application filed December 8, 1924. Serial No. 754,473.

This invention relates to decoys intended for use as a lure in hunting water-fowls and other game.

The object of the present invention is the perfecting of decoys of the foldable or collapsible type, to render the same more effective and extend their usefulness.

More specific objects and advantages of the invention will appear in the following description.

The invention consists in the novel construction, adaptation and combination of parts hereinafter described and claimed.

In the accompanying drawing:—

Figure 1 is a perspective view of a decoy embodying my invention; Fig. 2 is a side elevation of the body portion of the decoy with the head member represented as sheathed within the body; and Fig. 3 is a vertical transverse sectional view of Fig. 1.

In the drawing, the decoy is illustrated in the form of a goose, but which may be of any other suitable form.

As shown, the body of the decoy comprises two complementary side wall members 5 having the profile of the bird to be simulated, the outer surfaces of which are painted or otherwise marked and colored to represent plumage.

The wall members 5 are made of binder board or other suitable material which is water proof or rendered so. Said wall members are connected together by means of sewing or with staples, as indicated by 6, along their upper margins from its tail end 7, as shown in Fig. 2, to a position at a short distance in front of the midlengths of said members. These wall members are also connected together in proximity of their front ends as by means of an eyelet 9 which also serves to pivotally connect the neck portion 10 of the head member 11 to the wall members and between the latter.

By being thus connected the head member may be swung into its dotted line position in Fig. 2 or into its operative position as represented by full lines in Fig. 1. The head member is releasably secured to the wall members of the body by suitable means such, for example, as a pin 12 engaging in registering holes 13 and 14 provided in the body and head members respectively.

15 and 16 indicate eyelets provided one above the other in each of the wall members to receive vertically spaced studs 17 projecting laterally from a plate 18 having upwardly converging side edges 19 substantially as shown in Fig. 3.

The plate 18 is stamped or otherwise formed to provide medially of its width offset portions 20 and 21 to afford apertured bosses to receive a supporting rod 22.

To enable it to readily penetrate the ground the lower end of the rod may be somewhat pointed and its upper end is bent to provide a laterally directed bracket element 23.

When the decoy is to be used, the head member 11 is first swung from its dotted line position (Fig. 2) into its full line position in Fig. 1 whereat the head member is secured by means of the pin 12 inserted in the holes 13 of the body walls 5 and the hole 14, shown in Fig. 2, of the head member.

The rod 22 is next inserted through the apertured bosses 20 and 21 of the plate 18, which latter is then inserted between the body walls 5, see Fig. 3, with the plate studs 17 engaged in the eyelets 15 and 16 to retain said walls in the relatively distended positions in which they are represented in Fig. 3. Whereupon the rod 22 is pushed into the ground by means of the bracket employed as a handle, and finally, the decoy body is supported upon the bracket element 23 of the rod when such element is disposed to be within the interstice between the body walls 5 and below the foremost of the stitching or staples 6.

To safeguard the decoy body from injury when engaging the rod in the ground, the rod is most advantageously manipulated from above the decoy body as, for example, when the rod and its bracket element are in positions indicated by 22¹ and 23¹, respectively, in Fig. 1.

After first removing the plate 18, the decoy head member and the body may be folded into their Fig. 2 condition and by then bringing the side walls 5 together the assembly occupies little space for storage or transportation.

It is possible that modification may be made to the hereinbefore described construction and arrangement of parts, I therefore do not wish to confine myself specifically thereto except as limited by the appended claims.

What I claim, is:—

1. A decoy having a body comprising side walls connected together at their upper margins, a head member pivotally connected to the front portion of the body, a plate adapted to be inserted in a substantially vertical plane within the body and detachably secured to the side walls thereof, and body supporting means engaging said plate.

2. A decoy having a collapsible body comprising two side walls connected together at their upper margins, apertures provided one above the other in each of said side walls, and a plate having spaced stud elements engageable in the respective apertures for detachably securing the plate to the walls for maintaining the same in their relatively distended positions.

3. A decoy having a collapsible body comprising two side walls and a head member pivotally connected thereto, a plate adapted to be inserted between said walls for maintaining the same in relatively distended positions, means for detachably connecting the plate to said walls, and a rod extending through said plate and engaging the body above the latter for supporting the same.

4. A decoy having a collapsible body comprising two side walls, means detachably connected to the body between the side walls thereof, and a rod extending upwardly through said means, said rod being provided with a bracket element which is engageable with the body for supporting the same.

5. A decoy having a collapsible body composed of two apertured side walls connected together along their upper margins, a body supporting means, and means located within the body and engageable within the apertures of the walls for retaining the first named means in body supporting position.

6. A decoy having a collapsible body consisting of two longitudinal side walls disposed in side by side relation, means securing the upper margins of the side walls directly together, a body supporting means engaging said walls securing means and a device detachably connected to the body walls for spreading apart the lower portions of said wall in downwardly diverging directions, retaining the second named means in body supporting position.

7. A decoy having a collapsible body comprising two side walls secured together at their upper margins, a head member having a neck portion located between said walls and pivotally connected thereto to permit the said member being positioned between said walls when not in use, means engaging in the respective walls for securing said member in operative position to the body, a body supporting rod and means engaging both of said walls and also said rod for retaining the latter in body supporting position.

8. A decoy having a collapsible body comprising two side walls connected together at their upper margins, apertures provided in said side walls, and a means including stud elements engageable in the respective apertures for detachably securing said means to said walls for maintaining the latter in their relatively distended positions.

9. A decoy having a collapsible body composed of two side walls connected together along their upper margins, a body supporting means, and a body distending plate located within the body and detachably engaging in said walls for retaining the said means in body supporting position.

Signed at Seattle, Washington, this 18th day of November, 1924.

WILLIAM R. JOHNSON.